Figure 1:
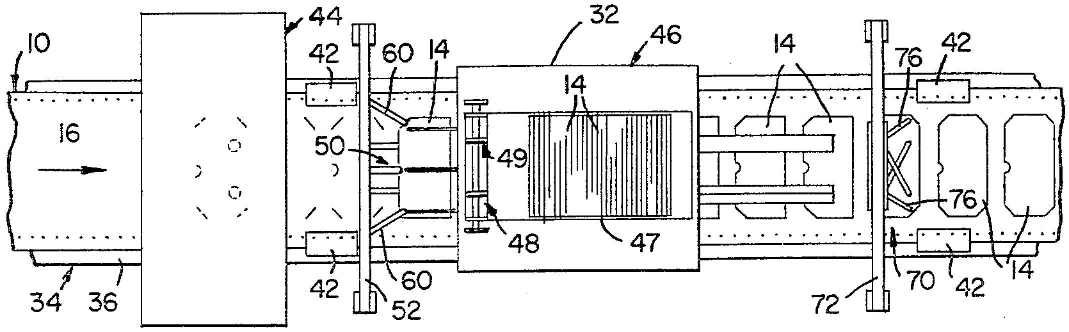
Figures 2, 3, 4:
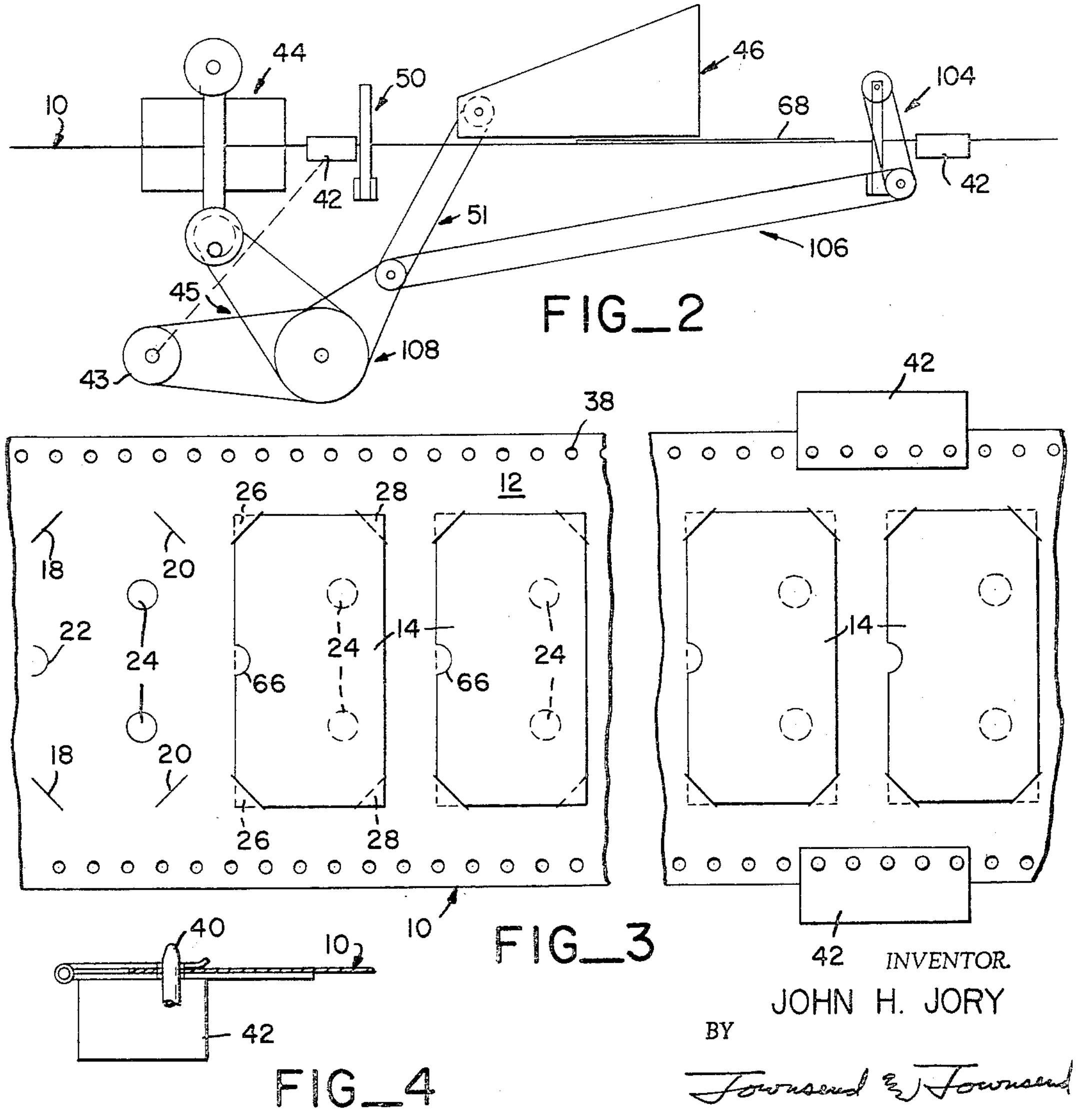
Figure 5:
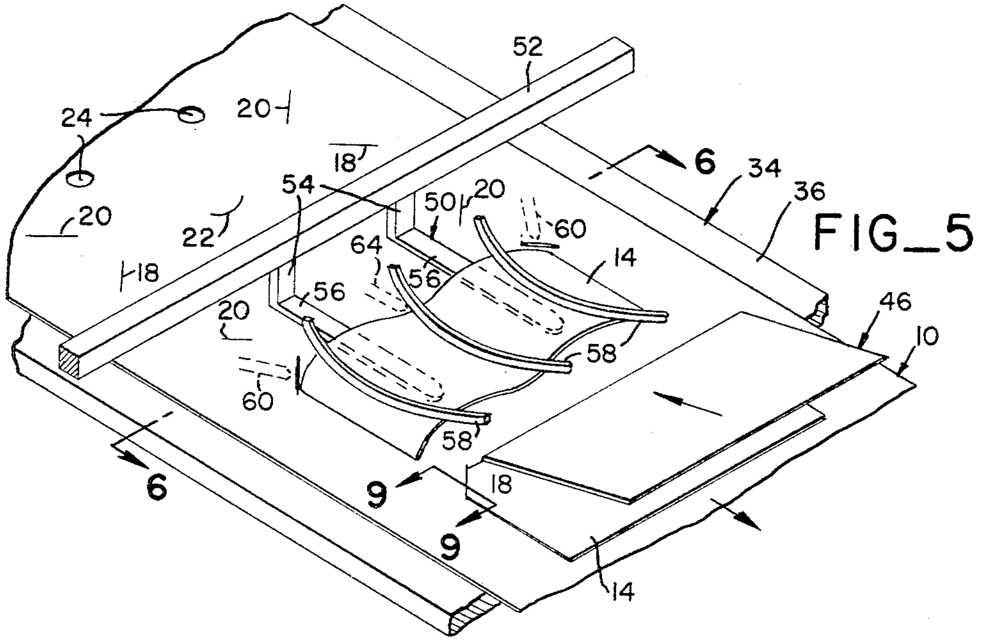

Dec. 16, 1969 J. H. JORY 3,484,097

METHOD AND APPARATUS FOR INSERTING CARDS IN A CARRIER WEB

Filed Oct. 26, 1966 4 Sheets-Sheet 1

INVENTOR.
JOHN H. JORY
BY
Townsend & Townsend
ATTORNEYS

METHOD AND APPARATUS FOR INSERTING CARDS IN A CARRIER WEB

Filed Oct. 26, 1966

INVENTOR
JOHN H. JORY
BY
Townsend & Townsend
ATTORNEYS

METHOD AND APPARATUS FOR INSERTING CARDS IN A CARRIER WEB

Filed Oct. 26, 1966 4 Sheets-Sheet 3

INVENTOR.
JOHN H. JORY
BY
Townsend & Townsend
ATTORNEYS

Dec. 16, 1969 J. H. JORY 3,484,097

METHOD AND APPARATUS FOR INSERTING CARDS IN A CARRIER WEB

Filed Oct. 26, 1966 4 Sheets-Sheet 4

*INVENTOR.*
JOHN H. JORY

BY

Townsend & Townsend
ATTORNEYS 88 to which cams 86 are connected. Each pin has a convex upper surface 90 for engaging the card and a spring 85 biases each pin 84 downwardly. Pins 84 raise card 14 when lobes 87 of cams 86 are at their highest positions.

A pair of second cams 92 carried on a rotatable shaft 94 forces a pair of pins 96 toward web 10 to urge a clamping plate 98 into engagement with the card to hold the trailing edge section of the latter on the web as the leading edge section is shifted outwardly of the web by pins 84. Springs 100 retract the pins 96 when the lobe of each cam 92 is at its outermost location.

Figures 10, 11, 12, 13, 14:
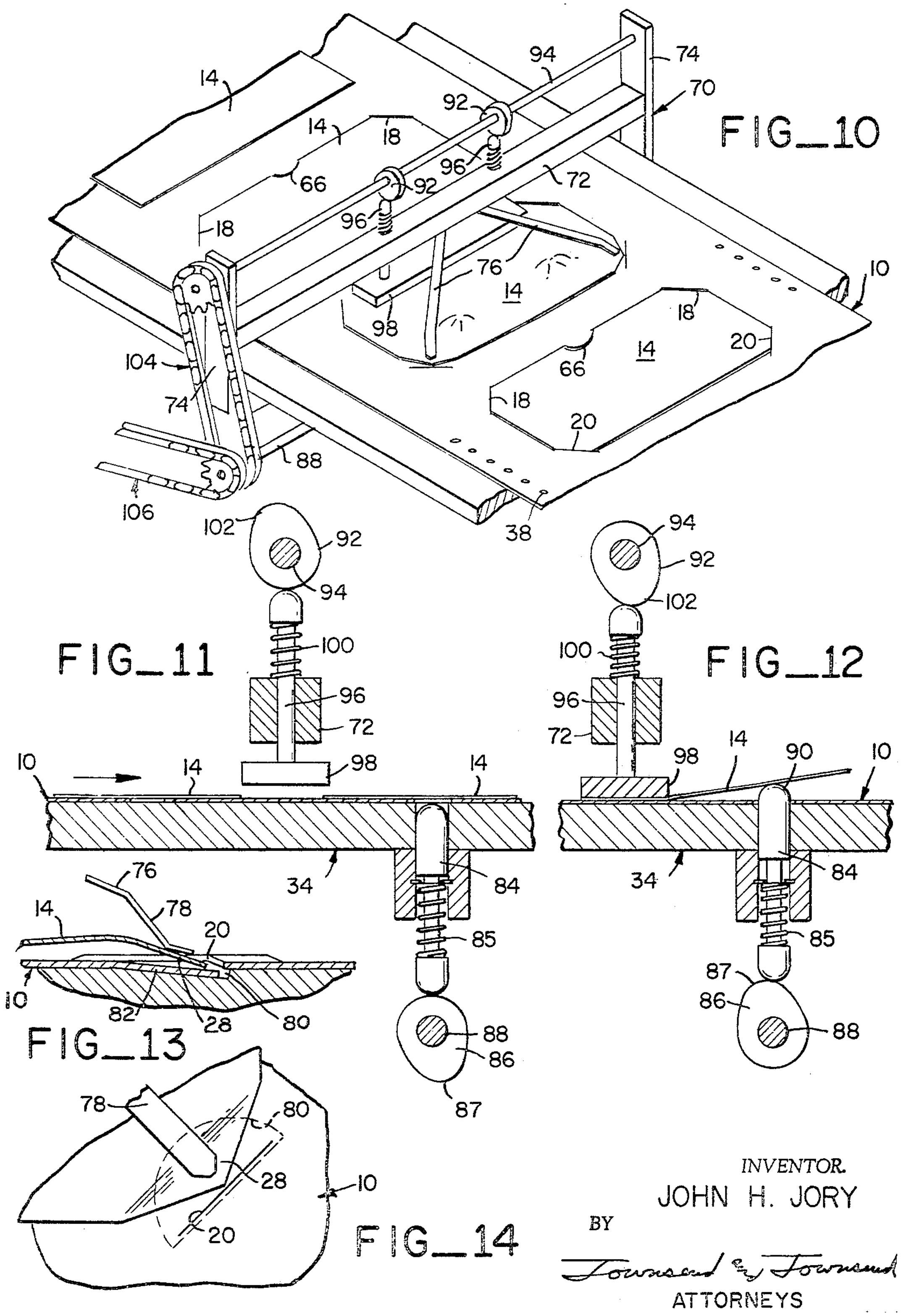
Figure 15:
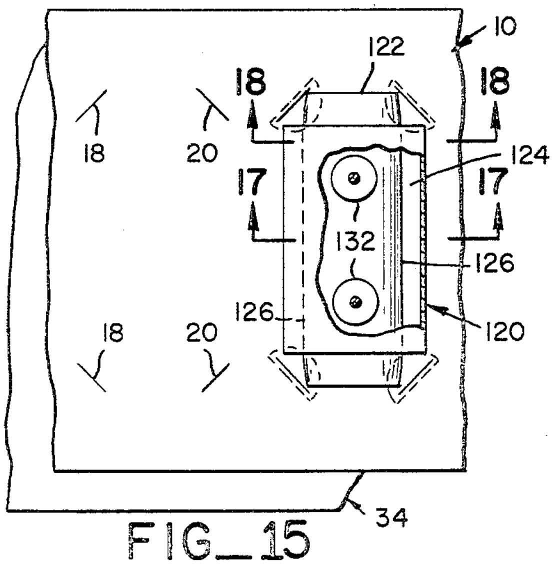

As the card moves outwardly of the web, ends 78 of fingers 76 bias corners 28 against the web to assure the opening of slits 20 when the latter are positioned over recesses 80. In FIG. 11, the relative dispositions of pins 84 and 96 are shown as a card is moved into an operative disposition relative to structure 70. In FIG. 12, the flexin of a card is shown and FIG. 14 shows one end 78 of a finger 76 engaging a corner 28 above the corresponding recess 80.

In FIG. 10, a chain and sprocket assembly 104 interconnects shafts 88 and 94 and a chain and sprocket assembly 106 provides a power take-off means for coupling shafts 88 and 95 with power source 43. A suitable control (not shown) is used to actuate cams 86 and 92 in timed sequence relative to the movement of web 10.

OPERATION

To prepare apparatus 32 for operation, a supply of web 10 is provided adjacent to one end of support 34 and the web is coupled to devices 42. A plurality of cards 14 are placed in tray 47. Power source 43 is preferably an electric motor and electrical power will be supplied thereto for actuation of the same.

The first step of the method of the invention is the die cutting of the web to form slits 18, 20 and 22 and holes 24. Power source 43 actuates unit 44 to effect this die cutting action. The card will be stationary when this function is performed. Thereafter, the web is then moved downstream of unit 44 and simultaneously with this movement, a card 14 will be moved from tray 47 by feed means 48 into coupled relationship with structure 50. The card and its upstream corners and upstream central marginal edge portion 30 will be flexed downwardly and forcibly engaging the web.

As web 10 continues to move downstream slits 18 will be opened by fingers 60 and slit 22 will be opened by finger 64. Since these slits are aligned with corners 26 and portion 30 respectively, these extremities of the cards will automatically be received in the slits. Web 10 will continue to move to, in turn, move slits 18 and corners 26 together. As soon as corners 26 begin to be inserted into their slits 18, they will tend to flatten out as the card moves away from fingers 54 and rods 58. Slits 18 and 22 will close as the slits move away from fingers 60 and 64 and the card will be coupled to and will move with the web.

Movement of web 10 downstream of structure 50 causes each card 14 to move into the position adjacent to structure 70 as shown in FIG. 10. It is to be understood that web 10 will be moved intermittently so that there may be a number of cards 14 progressively advancing toward structure 70 from structure 50 at the same time. The movement of the web and the operations of feed means 48 and structure 70 are correlated with each other in accordance with a predetermined timed sequence.

Figure 9:
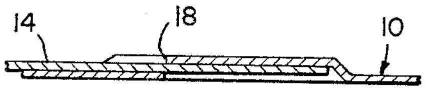
Figures 6, 7:
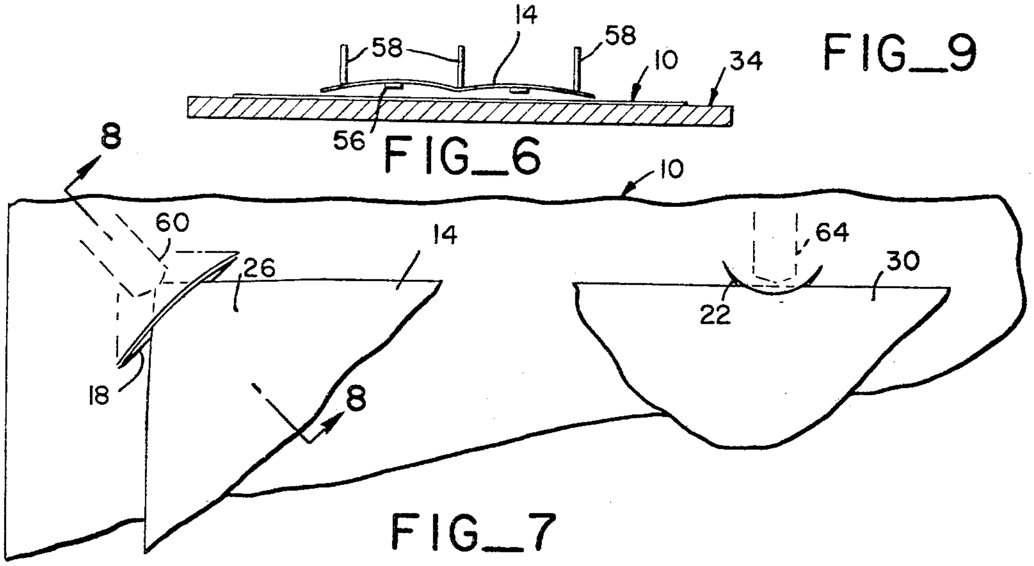
Figure 8:
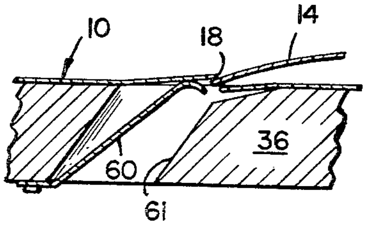

As each card moves into coupled relationship to structure 70, fingers 76 hold corners 28 against web 10 as cams 86 and 92 are rotated through a half-cycle by shafts 88 and 94. The card is thus flexed upwardly and corners 28 are flexed downwardly into the positions shown in FIG. 13. Slits 20 will open and as shafts 88 and 94 continue to rotate through the remaining half-cycle card 14 will lower to its unflexed position. It is the card which moves relative to web 10 to effect the insertion of corners 28 into slits 20. The slits remain open as corners 28 move toward the same as the card is lowered and, as soon as corners 28 enter the slits, such corners are released from the bias force exerted thereon by fingers 76. This action, in turn, releases the bias force on portions 82 and slits 20 effectively close and assume a configuration similar to that shown in FIG. 9.

The card is then coupled at its four corners and at its trailing edge to the web and can then be moved with the latter toward a processing machine downstream of structure 70. The succeeding cards are coupled to the web in the same manner and the entire operation is accomplished in accordance with the aforesaid predetermined timed sequence. Thus, while one card 14 may be in an operative position adjacent to structure 70 as shown in FIG. 10, succeeding cards 14 may be in various stages on the web between structure 50 and structure 70. As shown in FIG. 10, a pair of succeeding cards immediately follow the card flexed by fingers 76 and a preceding card is completely coupled to the web.

Web 10 may be provided with spaced, transverse fold lines with one or more cards between each pair of adjacent fold lines. Thus, the sections of web 10 defined by the fold lines can be superposed and thereby stacked on each other if the web and card assembly is to be stored for subsequent use. The fold lines can be scored and located adjacent to the upstream or downstream slits at a particular card receiving location on the web. Thus, the cards can be readily removed from the web by tearing the latter after the cards have been printed or processed. This card removal operation is disclosed in U.S. Patent No. 3,214,083.

Figure 16:
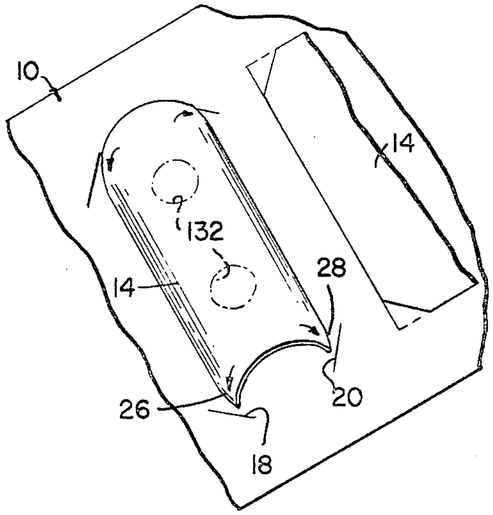

Alternate forms of the structure for flexing each card are shown in FIGS. 16–23. In the first of these forms, as shown in FIGS. 15–19, a suction device 120 is positioned adjacent to the path of web 10 and is provided with a housing 122 having a bottom 124. A pair of spaced edges 126 on bottom 24 define a card-receiving opening for housing 122. Edges 126 are configured to cause the card to be transversely bowed as shown in FIG. 16 when the card is drawn partially into the housing by suction and also to flex the corners 26 and 28 of the card to a greater extent than the remaining portions of the card. Thus, the corners of the card will be forced into engagement with the web and will be biased so that the slits 18 and 20 will be opened when they become aligned with the corners. Here again, recesses are provided in support 34 to receive the flexed portions of the web to allow for the opening of the slits.

A pair of suction cups 132 are mounted in housing 122 for reciprocation toward and away from the card. A fluid actuated piston and cylinder assembly 134 connected to housing 122 is coupled to each cup 132 for raising and lowering the same. Suitable conduit structure (not shown) is used to connect each suction cup 132 to a vacuum source. Also, the entire suction device 120 is vertically reciprocal so that housing 120 as well as cups 132 can be lowered into proximity to the web.

Figures 17, 18, 19:
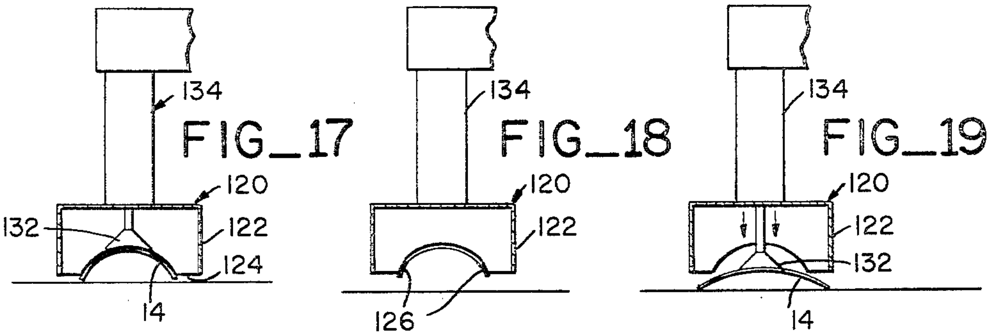

To bow the card as shown in FIG. 16, the cups 132 are lowered to the web while housing 122 remains spaced above the web. The cups will then be subjected to the suction pressure and will draw card 14 therebeneath away from web 10 by suction. Edges 126 will cause the card to bow in the manner shown in FIG. 16 as cup 132 is raised. FIG. 19 shows the card as it is being raised from the web. This bowing of the card may take place either before or after slits 18 and 20 become aligned with corners 26 and 28. Feed means 48 will have positioned the card in place below housing 122. FIG. 18 shows the card at its highest position. The card is properly bowed and the side edges of the card project downwardly from housing 122 to facilitate the opening of the web slits when the card is lowered.

Suction device 120 is then lowered as shown in FIG. 17 while the card remains bowed. The card corners are first to engage the web and they open the web slits aligned therewith. This causes the corners of the card to slide in respective directions along the web and toward and into the opened slits. The suction is removed from cups 132 as device 120 is lowered so that the inherent resilience of the card returns it to its substantially flat configuration. The card corners are, however, in the slits by this time so that the card is then coupled to the web.

Figures 20, 21, 22, 23:
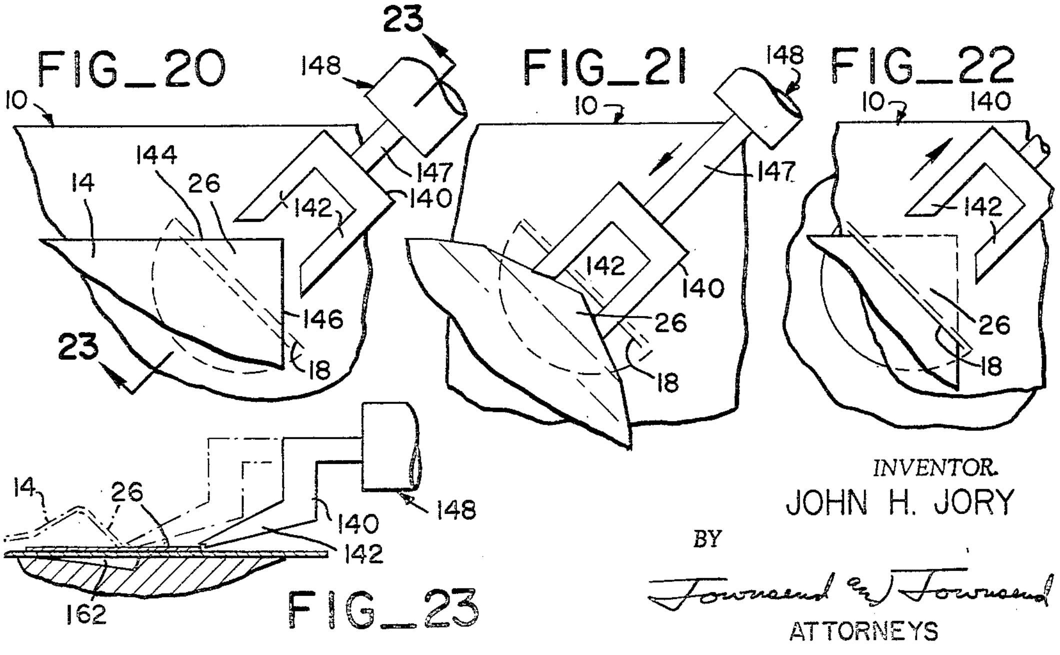
Figures 1, 7, 8, 9:
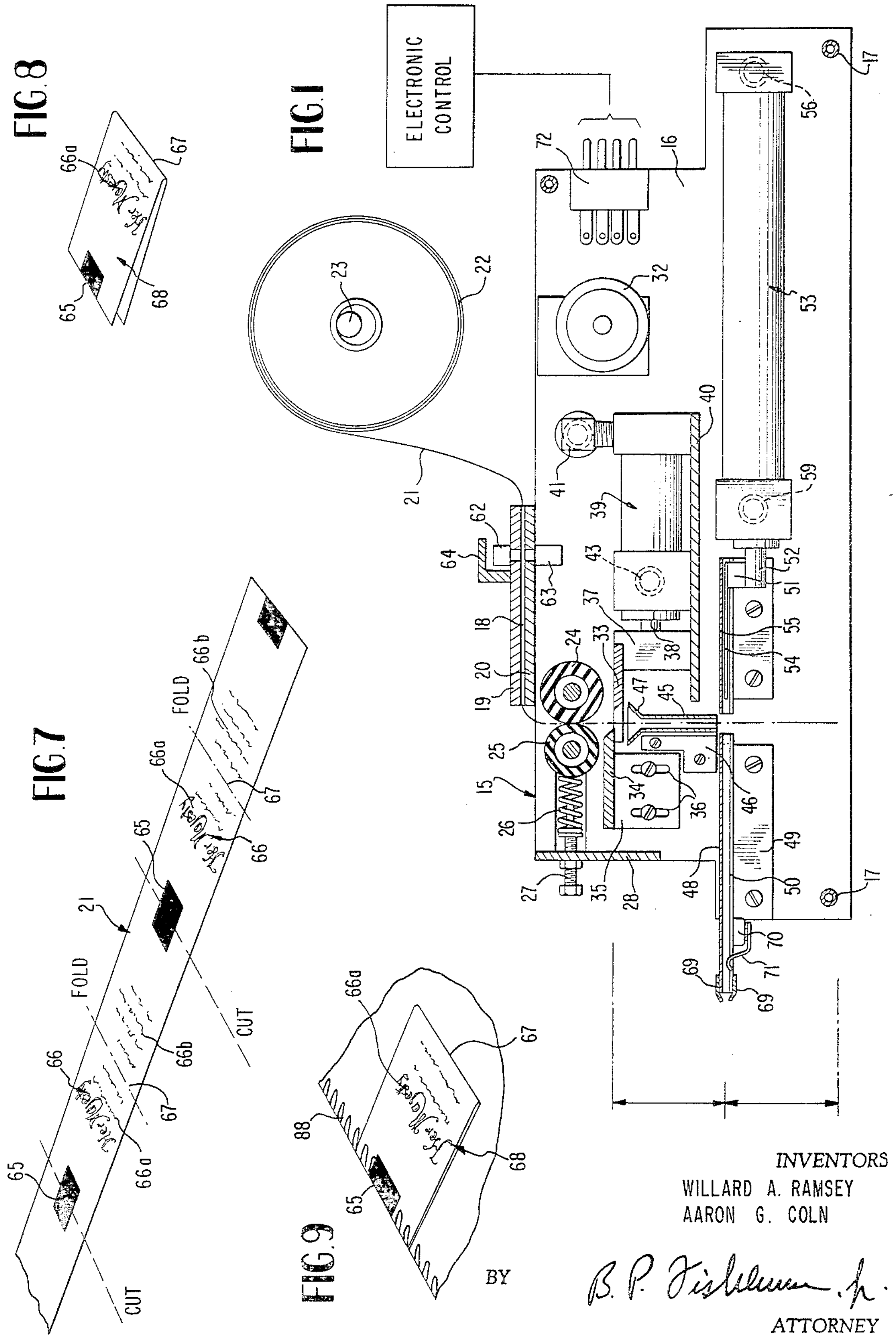

A second of the alternate forms for flexing the corners of a card is shown in FIGS. 20–23 and includes a bifurcated, card-engaging member 140 for each corner of a card respectively. Each member 140 has a pair of spaced legs 142 whose outer ends are adapted to engage the convergent edges 144 and 146 which define a respective corner of the card. As shown, edges 144 and 146 define one of the corners 26. Member 140 is coupled to the reciprocal rod of a piston and cylinder assembly 148 which is actuated and controlled in accordance with the aforesaid predetermined timed sequence. The outer end of each leg 142 is indented as shown in FIG. 23 to complementally engage the corresponding edge of the card and thereby shift the corner into the dashed line position above a recess 162 in support 34.

When assembly 148 is actuated, rod 147 is extended outwardly and flexes the corner as shown in FIG. 23. When this occurs, the corner engages the adjacent portion 64 of web 10 and forces it downwardly into recess 162 to thereby open slit 18.

As assembly 148 is deactuated, rod 147 retracts and, in doing so, allows corner 26 to move toward and to be inserted into opened slit 18. As the corner moves toward the slit, it is progressively released from the flexing or bias force exerted thereon by legs 142. However, the slit will remain at least partially open during this time so that the corner is assured of being inserted into the slit.

In utilizing this form of flexing structure, members 140 will operate simultaneously. Thus, a suitable control (not shown) is provided to correlate the movements of members 140 with the movement of web 10. Feed means 48 will also cooperate with members 140 to position each card in the proper disposition on the web so that legs 142 will readily move into engagement with respective edges 144 and 146 when rods 147 are extended.

While several embodiments of this invention have been shown and described, it will be apparent that other adaptations and modifications can be made without departing from the true spirit and scope of the invention.

What is claimed is:

1. Apparatus for coupling a flexible sheet member to a flexible web member having a slit with the sheet member having a width less than that of said web member comprising: means for mounting said web member in a first position; means adapted to be coupled to said sheet member for moving the same relative to the web member into a second position adjacent to one face of the web member and between the sides thereof with one extremity of the sheet member aligned with the slit; means coupled with at least one of the members for moving said web member and said sheet member relative to each other in a direction and by an amount sufficient to permit said extremity and the slit to move toward each other and thereby effect the insertion of said extremity into the slit when the latter is open and when sheet member is at said second position; and means adjacent to one of said positions engageable with a first of said members for flexing the same sufficiently to cause said slit to open as a function of the movement of said members relative to each other.

2. Apparatus as set forth in claim 1, wherein said web member is formed of a material capable of being cut, and wherein is included cutter means spaced longitudinally of said engageable means with reference to said web member for cutting the latter to form said slit.

3. Apparatus as set forth in claim 1, wherein said web member is movable relative to said engageable means, and wherein is included a supply of said sheet members, feed means for directing individual sheet members from said supply toward said engageable means, and control means for synchronizing the movement of said web member relative to said engageable means and with respect to said feed means, whereby the coupling of said sheet members will be accomplished automatically and in accordance with a predetermined timed sequence.

4. Apparatus for coupling a sheet to a web with the web having a slit therein and being of a width greater than that of said sheet comprising: means for mounting the web for movement along a predetermined path; means adapted to be coupled with said web for moving the same along said path; means adjacent to said path for moving a sheet into a position adjacent to and between the side of the web; means adjacent to the web for effecting the opening of the slit when the latter is in proximity to said position; and means for moving the web and the sheet relative to each other in a direction and through a distance sufficient to cause the sheet to be received within the slit when the slit is open, said web and said slit opening means being movable relative to each other in a direction and by an amount sufficient to cause the slit to close after the sheet has been received within the slit.

5. Apparatus for coupling a flexible sheet to a web having a pair of spaced slits comprising: means for mounting the web for movement along a predetermined path; means shiftable relative to and engageable with the web for opening the slits when the latter are in a predetermined position along said path and as a function of the relative movement of said web and said sheet; means adjacent to the path for positioning a sheet to be coupled to the web in proximity to said position and between the sides of the web with a pair of extremities of the sheet being in alignment with respective slits, said web and said sheet being movable relative to each other in a direction and through a distance sufficient to cause the extremities of the sheet to enter the slits when the latter are open, said opening means being movable relative to the web and out of engagement therewith after said extremities have been received within the slits, whereby the slits will close with the extremities therein; and means cooperable with the web and the sheet to move the same relative to each other.

6. Apparatus for coupling a flexible, substantially rectangular card to a flexible web having a number of spaced slits therein for respective corners of the card comprising: means for mounting the web in a predetermined position; structure engageable with the corners of the card to flex the same and to align the corners thereof with respective slits in the web; means engageable with the web on respective sides of the slits for opening the slits when the corners of the card are aligned therewith, and means for moving said web and said structure relative to each other when the web is in said position and when said card is adjacent to one face of the web and when the slits are open to effect insertion of the card corners in respective slits.

7. Apparatus for handling a flexible, substantially rectangular card comprising: a flexible web having a pair of upstream slits and a pair of downstreams slits for respective corners of the card, a slit between the upstream slits for the longitudinal edge of the card and a web portion on one side of each slit respectively; means mounting the web in a position for movement along a predetermined path; means adjacent to said path for positioning the card adjacent to one face of the web and including structure engageable with said corners to flex the same and thereby move the corners and said edge of the card into alignment with respective slits; means engageable with respective web portions to effect opening of the corresponding slits; means for moving said web and said card relative to each other when the card is adjacent to said web face and when said slits are open to effect the insertion of the corners and said edge into the opened slits, said web and said slit opening means being movable relative to each other to close said slits after the corners and the edge have been inserted therein; and means for moving the web relative to said card and to said opening means.

8. In combination: a flexible web member having a plurality of longitudinally spaced slits therein; means mounting said web member for movement along a predetermined path; a plurality of flexible sheet members each having a width less than that of said web member, there being a slit for each sheet member respectively; means engageable with said sheet members for successively positioning the same adjacent to one face of the web member and between the sides thereof when the corresponding slit is at a first position along said path and with one extremity of the sheet member being alignable with its slit; engagement means adjacent to said path for flexing one of said web and sheet members when the sheet member is adjacent to said one face of the web member to bias the flexed member in a direction and by an amount to cause the corresponding slit to open; means for moving said web member and said sheet member adjacent to said one face relative to each other to permit the extremity of the last-mentioned sheet member and the corresponding slit to move toward each other to thereby effect the insertion of the extremity into the slit after the latter has been opened; and means coupled with the web member for advancing the same by an amount sufficient to position it to receive the next succeeding sheet member.

9. Apparatus for coupling a flexible sheet member to a flexible web member having a slit with the sheet member having a width less than that of said web member comprising: means for mounting said web member in a first position; means adapted to be coupled to said sheet member for moving the same relative to the web member into a second position adjacent to one face of the web member and between the sides thereof with one extremity of the sheet member aligned with the slit; structure for removably mounting said sheet member at said second position; means coupled with at least one of the members for moving said web member and said sheet member relative to each other in a direction and by an amount sufficient to permit said extremity and the slit to move toward each other and thereby effect the insertion of said extremity into the slit when the latter is open and when sheet member is at said second position; and a resilient finger adjacent to one of said positions and engageable with said extremity for flexing the same sufficiently to cause said slit to open.

10. Apparatus for coupling a flexible sheet member to a flexible web member having a slit with the sheet member having a width less than that of said web member comprising: means for mounting said web member in a first position; means adapted to be coupled to said sheet member for moving the same relative to the web member into a second position adjacent to one face of the web member and between the sides thereof with one extremity of the sheet member aligned with the slit, said web member and said sheet member being movable relative to each other in a direction and by an amount sufficient to permit said extremity and the slit to move toward each other and thereby effect the insertion of said extremity into the slit when the latter is open and when sheet member is at said second position; structure defining a recess and suction means for drawing said sheet member into the recess, said structure having an edge engageable with said extremity to flex the same sufficiently to cause said slit to open, said structure being movable relative to said web member to effect insertion of said extremity in said slit.

11. Apparatus for coupling a flexible sheet member to a flexible web member having a slit with the sheet member having a width less than that of said web member comprising: means for mounting said web member in a first position; means adapted to be coupled to said sheet member for moving the same relative to the web member into a second position adjacent to one face of the web member and between the sides thereof with one extremity of the sheet member aligned with the slit; means coupled with at least one of the members for moving said web member and said sheet member relative to each other in a direction and by an amount sufficient to permit said extremity and the slit to move toward each other and thereby effect the insertion of said extremity into the slit when the latter is open and when sheet member is at said second position; a power member having a reciprocal structure engageable with the edge of said sheet member defining one boundary of said extremity; and means coupled with said power member for reciprocating the structure, said structure being movable relative to the web member in one direction through a distance sufficient to flex said extremity and to cause said slit to open and thereafter in the opposite direction to effect insertion of said extremity in said slit.

12. Apparatus for coupling a flexible sheet member to a flexible web member having a slit with the sheet member having a width less than that of said web member comprising: means for mounting said web member in a first position; means adapted to be coupled to said sheet member for moving the same relative to the web member into a position adjacent to one face of the web member and between the sides thereof with one extremity of the sheet member aligned with the slit, said web member and said sheet member being movable relative to each other in a direction and by an amount sufficient to permit said extremity and the slit to move toward each other and thereby effect the insertion of said extremity into the slit when the latter is open; first structure for holding a first section of said sheet member in a fixed position relative to said web member; second structure engageable with a second section of the sheet member for moving said second section away from said web member; and a finger engageable with said extremity for flexing the latter when said second section moves away from the web member, said second structure being movable out of engagement with said second section to permit the latter to move relative to and toward said web member to effect the insertion of said extremity into said slit.

13. Apparatus for coupling a sheet to a web with the web having a slit therein and being of a width greater than that of said sheet comprising: means for mounting the web for movement along a predetermined path; means adapted to be coupled with said web for moving the same along said path; means adjacent to said path for moving a sheet into a position adjacent to and between the sides of the web; a finger adjacent to the web and biased toward and into engagement with the portion of the web on one side of the slit to effect the opening of the slit when the latter is in proximity to said position; and means for moving the web and the sheet relative to each other in a direction and through a distance sufficient to cause the sheet to be received within the slit when the slit is open, said web and said finger being movable relative to each other in a direction and by an amount sufficient to cause the slit to close after the sheet has been received within the slit.

14. Apparatus for coupling a flexible sheet to a movable web having a pair of spaced slits angularly disposed relative to the direction of movement of the web for receiving the corners of the sheet and a third slit between said pair of slits, said apparatus comprising: means for mounting the web for movement along a predetermined path; means shiftable relative to and engageable with the web for opening the slits substantially at the same time when the slits are in predetermined positions along said path; means adjacent to the path for positioning a sheet to be coupled to the web in proximity to said position and between the sides of the web with a pair of extremities of the sheet being in alignment with respective slits, said web and said sheet being movable relative to each other in a direction and through a distance sufficient to cause the extremities of the sheet to enter the slits when the latter are open, said opening means being movable relative to the web and out of engagement therewith after said extremities have been received within the slits, whereby the slits will close with the extremities therein, and means cooperable with the web and the sheet to move the same relative to each other.

15. Apparatus for coupling a flexible sheet to a web having a pair of spaced slits laterally spaced apart relative to the longitudinal axis of the web comprising: means for mounting the web for movement along a predetermined path; a pair of laterally spaced fingers shiftable relative to and engageable with the web for opening the slits when the latter is in a predetermined position along said path; means adjacent to the path for positioning a sheet to be coupled to the web in proximity to said position and between the sides of the web with a pair of extremities of the sheet being in alignment with respective slits, said web and said sheet being movable relative to each other in a direction and through a distance sufficient to cause the extremities of the sheet to enter the slits when the latter are open, said opening means being movable relative to the web and out of engagement therewith after said extremities have been received within the slits, whereby the slits will close with the extremities therein; and means cooperable with the web and the sheet to move the same relative to each other.

16. Apparatus for coupling a flexible sheet to a web having a pair of spaced slits longitudinally spaced apart relative to the longitudinal axis of the web comprising: means for mounting the web for movement along a predetermined path; a pair of longitudinally spaced fingers shiftable relative to and engageable with the web for opening the slits when the latter is in a predetermined position along said path; means adjacent to the path for positioning a sheet to be coupled to the web in proximity to said position and between the sides of the web with a pair of extremities of the sheet being in alignment with respective slits, said web and said sheet being movable relative to each other in a direction and through a distance sufficient to cause the extremities of the sheet to enter the slits when the latter are open, said opening means being movable relative to the web and out of engagement therewith after said extremities have been received within the slits, whereby the slits will close with the extremities therein, and means cooperable with the web and the sheet to move the same relative to each other.

17. Apparatus for coupling a flexible sheet to a web having a first pair of laterally spaced slits and a second pair of laterally spaced slits with the second pair being longitudinally spaced from the first pair, said apparatus comprising: means for mounting the web for movement along a predetermined path; first means shiftable relative to and engageable with the web for opening the first pair of slits when the latter is in a predetermined position along said path; second means shiftable relative to and engageable with said web for opening the second pair of slits; means adjacent to the path for positioning a sheet to be coupled to the web in proximity to said position and between the sides of the web with a pair of extremities of the sheet being in alignment with respective slits, said web and said sheet being movable relative to each other in a direction and through a distance sufficient to cause the extremities of the sheet to enter the slits when the latter are open, said opening means being movable relative to the web and out of engagement therewith after said extremities have been received within the slits, whereby the slits will close with the extremities therein, and means cooperable with the web and the sheet to move the some relative to each other.

References Cited

UNITED STATES PATENTS

| | | | |
|---|---|---|---|
| 2,691,327 | 10/1954 | Hawley | 93—1 |
| 3,114,200 | 12/1963 | Di-Marzio | 29—453 X |
| 3,274,665 | 9/1966 | Higginson et al. | 29—453 X |
| 3,330,581 | 7/1967 | Ivarsson-Wallerstrom | 282—22 |

EUGENE R. CAPOZIO, Primary Examiner

P. V. WILLIAMS, Assistant Examiner

U.S. Cl. X.R.

93—1; 270—58

APPARATUS FOR FEEDING, SEVERING AND FOLDING LABELS AND PRESENTING SAME IN SUCCESSION FOR USE
Filed Feb. 13, 1967 3 Sheets-Sheet 1

INVENTORS
WILLARD A. RAMSEY
AARON G. COLN
BY
B. P. Fishburne, Jr.
ATTORNEY